(12) United States Patent
Okuma

(10) Patent No.: US 7,676,770 B2
(45) Date of Patent: Mar. 9, 2010

(54) APPARATUS AND METHOD FOR CREATING CIRCUIT DIAGRAM, PROGRAM THEREFOR AND RECORDING MEDIUM STORING THE PROGRAM

(75) Inventor: Sadayuki Okuma, Chuo-ku (JP)

(73) Assignee: Elpida Memory, Inc., Tokyo (JP)

( * ) Notice: Subject to any disclaimer, the term of this patent is extended or adjusted under 35 U.S.C. 154(b) by 681 days.

(21) Appl. No.: 11/086,532

(22) Filed: Mar. 23, 2005

(65) Prior Publication Data

US 2005/0229135 A1    Oct. 13, 2005

(30) Foreign Application Priority Data

Mar. 26, 2004    (JP) .............................. 2004-093410

(51) Int. Cl.
G06F 17/50 (2006.01)
G06F 9/455 (2006.01)

(52) U.S. Cl. ............................................ 716/2; 716/11

(58) Field of Classification Search .................. 716/11, 716/2

See application file for complete search history.

(56) References Cited

U.S. PATENT DOCUMENTS

| | | | | | |
|---|---|---|---|---|---|
| 5,640,098 | A | * | 6/1997 | Niijima et al. ............... | 324/751 |
| 5,875,115 | A | * | 2/1999 | Weber ........................ | 716/13 |
| 5,946,218 | A | * | 8/1999 | Taylor et al. ................. | 716/12 |
| 6,081,657 | A | * | 6/2000 | Ott .............................. | 716/11 |
| 6,480,995 | B1 | * | 11/2002 | Schmidt et al. .............. | 716/11 |
| 6,886,140 | B2 | * | 4/2005 | Regnier ....................... | 716/1 |
| 2002/0059553 | A1 | * | 5/2002 | Eng ............................. | 716/4 |
| 2003/0079190 | A1 | * | 4/2003 | Parashkevov et al. ......... | 716/4 |
| 2003/0139842 | A1 | * | 7/2003 | Regnier ....................... | 700/182 |
| 2003/0208721 | A1 | * | 11/2003 | Regnier ....................... | 716/1 |
| 2004/0003366 | A1 | * | 1/2004 | Suzuki ........................ | 716/11 |
| 2004/0031006 | A1 | * | 2/2004 | Kamon ........................ | 716/8 |
| 2004/0111688 | A1 | * | 6/2004 | Lee et al. ...................... | 716/12 |
| 2004/0199880 | A1 | * | 10/2004 | Kresh et al. .................. | 716/4 |
| 2005/0050506 | A1 | * | 3/2005 | Keller et al. .................. | 716/12 |
| 2005/0108672 | A1 | * | 5/2005 | Teene .......................... | 716/12 |

FOREIGN PATENT DOCUMENTS

| | | |
|---|---|---|
| JP | 63-115269 A | 5/1988 |
| JP | 2-128275 A | 5/1990 |
| JP | H05-290113 A | 11/1993 |
| JP | 6-68200 A | 3/1994 |
| JP | H07-073208 A | 3/1995 |
| JP | H09-097272 A | 4/1997 |
| JP | 2657028 B2 | 5/1997 |
| JP | 2000-011020 A | 1/2000 |
| JP | 2000-057183 A | 2/2000 |
| JP | 2000-067258 A | 3/2000 |
| JP | 2003-022294 A | 1/2003 |
| JP | 2003-050831 A | 2/2003 |
| JP | 2003-099488 A | 4/2003 |

* cited by examiner

Primary Examiner—Jack Chiang
Assistant Examiner—Suresh Memula
(74) Attorney, Agent, or Firm—Sughrue Mion, PLLC

(57) ABSTRACT

It is an object of the present invention to realize a circuit diagram creating method and circuit diagram creating apparatus capable of efficiently acquiring information on a lower layer, and a circuit diagram creating method for creating a layered electric circuit diagram from data indicating an electric circuit that includes the steps of determining an outline area to be displayed from wiring information and graphics information which are data indicating the electric circuit for symbol graphics of a lower layer and displaying information on the circuit diagram so as not to go beyond the outline area.

6 Claims, 24 Drawing Sheets

Fig.9

Table : EXAMPLE OF LIST OF INFORMATION TYPE AND DISPLAY PRIORITY

| Type of information | Display priority | Contents. |
|---|---|---|
| Wring | Essential | Display wiring of lower – layer circuit diagram as is. |
| Element | Essential | Display element graphics of lower – layer circuit diagram as is. |
| Terminal | Essential | Display position of terminal of lower – layer circuit diagram. Position may be changed depending on situation.Terminal shape may be different. |
| Cell name of cell concerned | ◎ | When circuit diagram symbol is disposed in higher layer, display cell name of the cell. |
| Instance name of cell concerned | ◎ | When circuit diagram symbol is disposed in higher layer, display instance name of the cell. |
| Terminal name of cell concerned | ○ | When circuit diagram symbol is disposed in higher layer, display terminal name of the cell. It may be displayed selectively. |
| Wiring name | △ | Display wiring name. |
| Wiring information | × | Displya wiring information. |
| Element information | △ | Displya element information such as circuit constant of element disposed in circuit diagram symbol. |
| Instance name of element | × | Display instance name of element disposed in circuit diagram symbol. |
| Cell name of element | × | Display cell name of element disposed in circuit diagram symbol. |
| Terminal name of element | × | Display terminal name of element disposed in circuit diagram symbol. |
| Comment | × × | Display comment. |
| Cell frame | × × | Display cell frame. |
| Cell information | × × | Display cell information. |
| Outline area | △ | Display outline area created in circuit diagram symbol. |

Display priority :
- Essential    Should always be displayed.
- ◎    Should be displayed in most cases.
- ○    Preferred to be displayed.
- △    May be displayed for clarity unless it degrades viewability.
- ×    Need not be displayed in most cases.
- × ×    Need not be displayed at all.

Fig.12
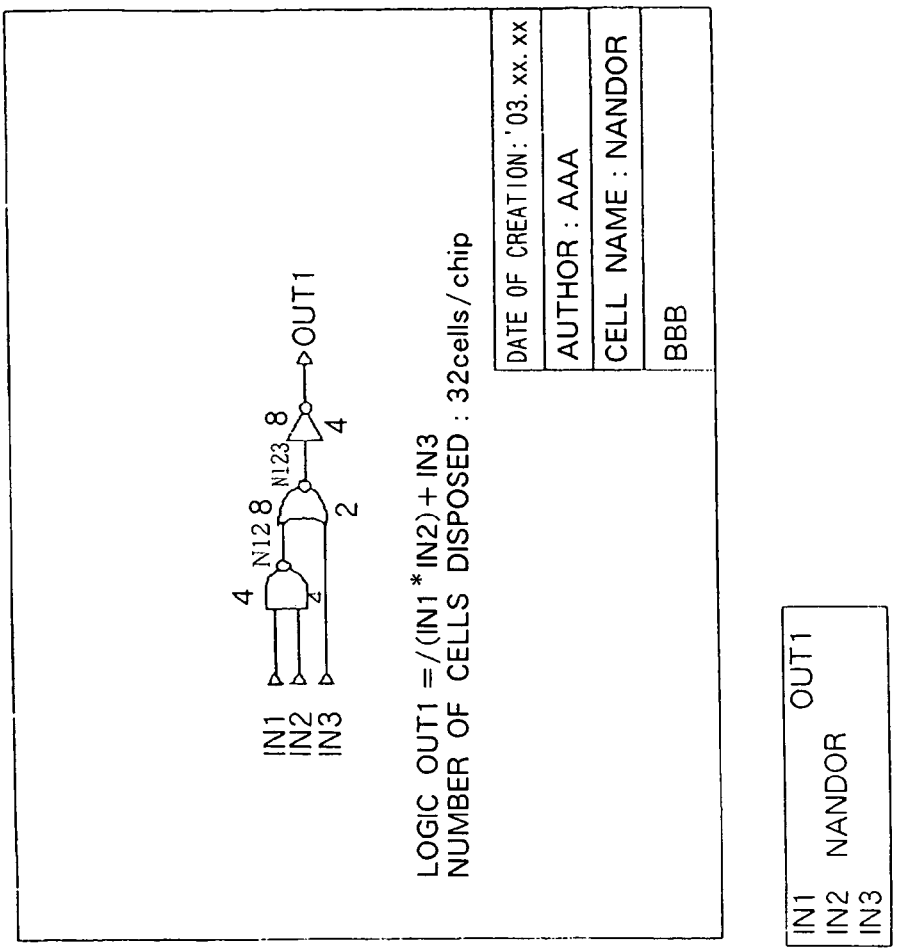

Fig.14
| CONTENTS | WHEN CONSTANT IS FIXED | WHEN CONSTANT IS VARIABLE |
|---|---|---|
| SYMBOL |  4 DESCRIBED IN CHARACTERS 4 | 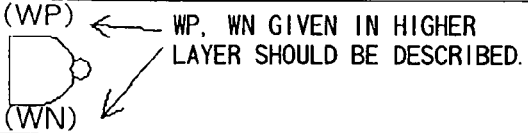 (WP) ← WP, WN GIVEN IN HIGHER LAYER SHOULD BE DESCRIBED. (WN) |
| NOTATION WHEN DISPOSED | | 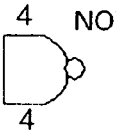 4 NOTATION WHEN WP = WN = 4 4 |
Fig.15
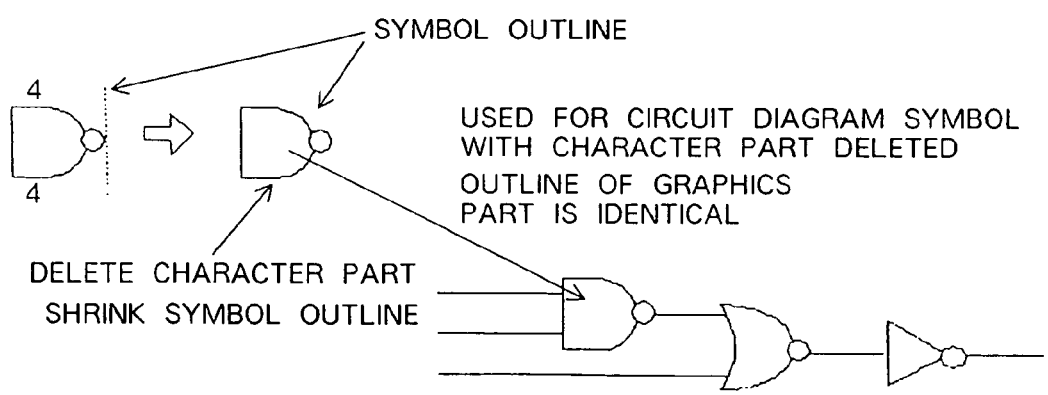

MORE WASTED AREAS

TERMINAL

Fig.27(a)

LIST OF RELATIONSHIP BETWEEN LOCKING STATE, POSSIBILITY OF CHANGE AND LINK STATE

| State | Presence of circuit diagram symbol | Terminal lock of circuit diagram | Lock of circuit diagram symbol | Possibility of change | | | Link | Remarks |
|---|---|---|---|---|---|---|---|---|
| | | | | Circuit diagram | Circuit diagram symbol | | | |
| Before creating circuit diagram symbol | No | No | — | All changeable | — | | — | |
| Immediately after creating diagram symbol | Yes | Yes | Yes | Terminal not changeable | Not changeable except changeable locations | | Yes | |
| When terminal of circuit diagram is unlocked. However, suppose terminal name of circuit diagram is not changed. | Yes | No | Yes | All changeable | Not changeable except changeable locations | | No | In case of no link, equivalency between circuit diagram and circuit diagram symbol is not guaranteed. So absence of link is displayed on circuit diagram symbol |
| When terminal name of circuit diagram is further added, deleted or changed | Yes | No | — | All changeable | | | Not usable | Circuit diagram symbol needs to be recreated. Prohibition of use is displayed on circuit diagram symbol |
| When symbol of circuit diagram is unlocked | Yes | Yes | No | Terminal not changeable | All changeable | | No | |

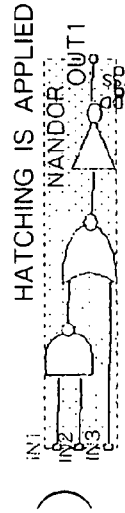

Fig.27(b)

DISPLAY EXAMPLE WHEN CIRCUIT DIAGRAM SYMBOL WITHOUT LINK IS DISPOSED IN HIGHER LAYER

HATCHING IS APPLIED TO WHOLE

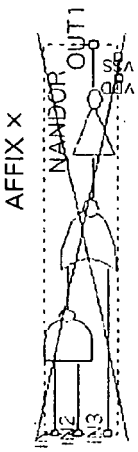

Fig.27(c)

DISPLAY EXAMPLE WHEN CIRCUIT DIAGRAM SYMBOL IN CASE OF PROHIBITION OF USE IS DISPOSED IN HIGHER LAYER

AFFIX ×

APPARATUS AND METHOD FOR CREATING CIRCUIT DIAGRAM, PROGRAM THEREFOR AND RECORDING MEDIUM STORING THE PROGRAM

BACKGROUND OF THE INVENTION

1. Field of the Invention

The present invention relates to a circuit diagram creating method and circuit diagram creating apparatus for a CAD apparatus for creating a layered electric circuit diagram.

2. Description of the Related Art

For a CAD apparatus for creating a circuit diagram, it is a common practice to describe a circuit diagram with layers taking into account logical consistency and repeatability, etc. In this case, as shown in FIG. 1, lower-layer drawings are normally schematized as rectangular boxes and arranged in a higher layer (in the following explanations, a lower-layer drawing schematized as a rectangular box will be called a "symbol"). In the example shown in FIG. 1, symbols with instance names NANDOR1 and NANDOR2 are described together with a cell name NANDOR. Thus, lower layers are expressed as black boxes and it is only possible to see higher-layer drawings and not possible to know the contents of the lower layers.

As a method for solving the problem that it is not possible to see the contents of a lower layer from a higher-layer drawing, there is a proposal for a method of displaying the contents of a lower layer in a symbol as shown in FIG. 2. However, since this method adopts a structure in which a circuit diagram is miniaturized and pasted so as to describe all information on the lower layer in the symbol, the circuit diagram is too small, has insufficient readability and cannot be actually used.

The invention described in Japanese Patent No. 2657028 is one that is capable of displaying how the circuits are related to each other among electric circuits of different blocks which are hierarchically expressed in an easily understandable way. This invention determines whether blocks are shown in a symbol form or schematic form according to a ratio of the block size shown on a display screen to the size of the display screen.

Of the above described conventional technologies, the one shown in FIG. 2 in which the circuit diagram is miniaturized and pasted so as to describe all information on the lower layer in the symbol, has a problem that it has insufficient readability.

The technology described in Japanese Patent No. 2657028 differentiates the display contents of the block according to the ratio of the block size shown on the display screen to the size of the display screen, and can thereby improve readability, whereas it does not always display necessary contents and has a problem that it is difficult to understand connection relations among electric circuits.

SUMMARY OF THE INVENTION

The present invention has been implemented in view of the problems of the conventional technologies and it is an object of the present invention to realize a circuit diagram creating method and circuit diagram creating apparatus capable of efficiently acquiring information on lower layers.

The circuit diagram creating method according to the present invention is a circuit diagram creating method for creating a layered electric circuit diagram from data indicating an electric circuit, comprising the steps of determining an outline area to be displayed based on wiring information and graphic information which are data indicating the electric circuit for symbol graphics of a lower layer and displaying information on the circuit diagram so as not to go beyond the outline area.

In this case, when the position of a terminal indicated by terminal information which is data indicating the electric circuit is inside the outline area, the terminal is displayed at that position, and when the position of the terminal is outside the outline area, the terminal may be displayed on the outline.

Furthermore, it is also possible to determine priority for each of various types of information making up the data indicating the electric circuit displayed as symbol graphics, display information in descending order of priority in the outline area and hide information when the information cannot be contained within the outline area.

The program according to the present invention causes a computer to execute the above described circuit diagram creating method.

The recording medium according to the present invention stores the above described program.

The circuit diagram creating apparatus according to the present invention is a circuit diagram creating apparatus which creates a layered electric circuit diagram from data indicating an electric circuit, comprising a reading apparatus which inputs data indicating the electric circuit, a data separation apparatus which separates various types of information making up the data indicating the electric circuit for each type, an outline creating apparatus which determines an outline area to be displayed from wiring information and graphics information out of the various types of information making up data indicating the electric circuit separated by the data separation apparatuses, an information addition apparatus which extracts additional information of the various types of information making up the data indicating the electric circuit separated by the data separation apparatus and a circuit diagram symbol creating apparatus which creates data for displaying information extracted by the information addition apparatus so as not to go beyond the outline area created by the outline creating apparatus.

In this case, it is also possible to further comprise a terminal setting apparatus which extracts terminal information indicating a terminal and position out of the various types of information making up the data indicating the electric circuit separated by the data separation apparatus and adapt the circuit diagram symbol creating apparatus so as to display, when the position of the terminal indicated by the terminal information extracted by the terminal setting apparatus is inside the outline area, the terminal at the position and create data for displaying the terminal on the outline when the position of the terminal cannot be contained within the outline area.

Furthermore, the circuit diagram symbol creating apparatus may also determine priority for each of the various types of information making up the data indicating the electric circuit separated by the data separation apparatus, display information in descending order of priority in the outline area and create data for hiding the information when the information cannot be contained within the outline area.

Being constructed as described above, the present invention produces the following effects:

The invention determines an outline area of symbol graphics in a lower layer to be displayed according to wiring and graphics information, displays information on the circuit diagram so as not to go beyond the outline area, and thereby displays only the necessary part of the circuit information of the lower layer in an appropriate size and in a higher layer when the lower layer is displayed in the higher layer, thus having the effect of improving readability of the higher-layer circuit diagram.

Furthermore, the present invention allows the higher layer to be created while observing the contents of the circuit diagram of the lower layer, thus having the effect of improving design efficiency of the circuit.

BRIEF DESCRIPTION OF THE DRAWINGS

FIG. 9 illustrates a list of types of information used in the present invention and display priorities thereof;

FIG. 12 illustrates an example of information stored in a circuit diagram editor;

FIG. 14 illustrates types of element information;

FIG. 15 illustrates an example of deletion of character information and an example of the graphics part of a circuit diagram symbol;

FIG. 27A to FIG. 27C illustrate a situation in which editing is locked.

DETAILED DESCRIPTION OF THE PREFERRED EMBODIMENTS

With reference now to the attached drawings, embodiments of the present invention will be explained below.

Before explaining specific embodiments of the present invention, circuit information handled by an apparatus according to the present invention will be explained.

Of circuit diagram creating apparatuses, the present invention relates to one having layers and having the function of creating a circuit diagram. Suppose that the circuit diagram creating apparatus according to this specification has a plurality of information sheets per cell such as circuit diagram information and symbol information for disposing the circuit diagram in a higher layer.

The information sheet refers to information of different types stored in a circuit or circuit diagram editor and, for example, circuit diagram, symbol graphics, functional descriptions for logical verification, etc., that correspond to this information sheet. Therefore, a minimum of two sheets, that is, a circuit diagram and a symbol graphics usually exist in one circuit.

Figure 11:
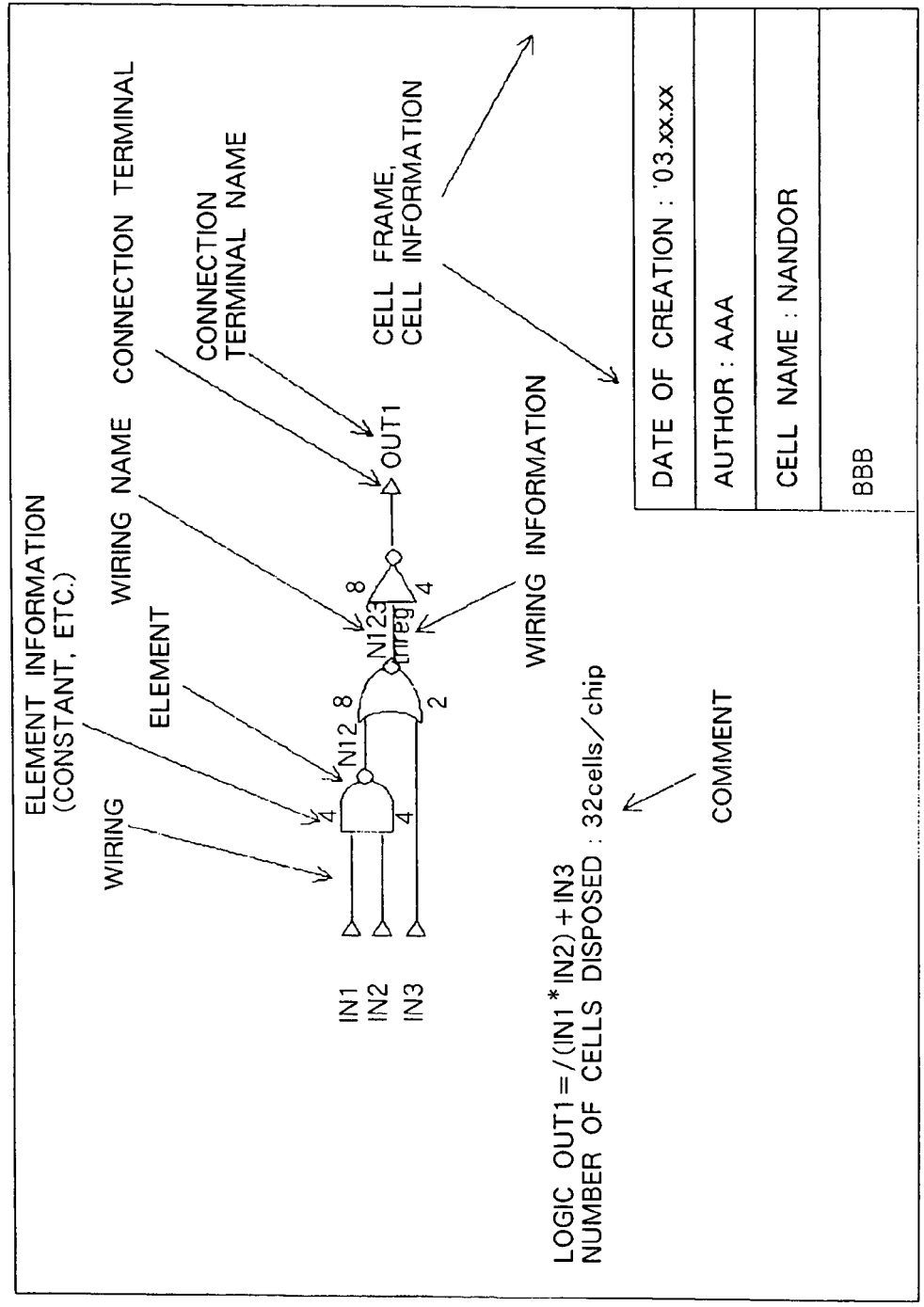
FIG. 11 illustrates an example of a circuit diagram in a lower layer.

FIG. 11 illustrates a general example of a circuit diagram. As shown in the figure, information shown in the circuit diagram includes wiring, element information, element, wiring name, wiring information, connection terminal, connection terminal name, comment, cell frame, cell information, etc. These pieces of information can be roughly classified into the following three categories:

(1) Information on Element

Element: A symbol graphics of a circuit in a lower layer disposed in a circuit diagram. The shape of the symbol graphics is defined in a lower layer.

Element information: Part of information of an element disposed may be displayed. An instance name and parameter are examples of this. An instance name is essential information when a net list is created from a circuit diagram, and therefore there is no case where no instance name is added. However, an instance name may be added manually or automatically. A parameter is information added only when it is necessary to create a net list and a gate width and gate length of a MOS symbol whose constant is variable, etc., correspond to this element information.

(2) Information on Connection

Wiring: Information graphically defining a connection between elements or between a connection terminal and an element which will be described later. There are cases where these elements or terminals are directly connected and cases where a connection is defined by a wiring name but no wire itself is connected, as will be described later. These two methods are used in combination. There is also special wiring such as a bus description, but the basic concept is the same.

Wiring name: Name of the above described wiring. Since the wiring name as well as instance name of element information is information essential in creating a net list, the wiring name is not omitted under any circumstances. The instance name is added manually or automatically even if the instance name is preset.

Wiring information: When a net list is created, there are rarely cases where it is desirable to add information to wiring. For example, a case where intensity is added to wiring in logical verification word correspond to this. In this case, for example, signal intensity may be set for the wiring itself.

Terminal: A concerned circuit usually has connections to other circuits. This definition is made in a higher layer, but terminals are provided to connect the circuit concerned to the other circuits for this purpose. These terminals are displayed in symbol graphics. Attributes such as IN/OUT are added to the connection terminals.

Connection terminal name: A name of a connection terminal. The connection terminal name is the same as the wiring name. Therefore, when there is wiring having the same name as the connection terminal name, it has the same node although not shown.

(3) Information for Improving Recognition Level of Circuit Diagram

Cell frame: A cell may be provided with a frame to make the range of the cell easy to see. This is called a "cell frame." The cell frame may be a rectangular frame only or may be accompanied by details so as to identify the position in the frame to a certain degree like a map. A field in which cell information, which will be described later, is described is often provided in part of the cell frame.

Cell information: Describes cell information such as cell name, creation date and time, author of the cell. These are described in fields provided within the cell frame.

Comment: Describes the purpose of a concerned circuit, operation, connection with other circuits, layout, arrangement information, etc., in characters, graphics or both of them.

All such information is basically necessary as information to know lower-layer circuit diagrams, but it is obvious that all these pieces of information are not always necessary for a higher layer. For example, the higher layer does not require cell frames of lower layers, but the higher layer only requires information which shows connections and structure of the lower layer in an easily understandably way. For this reason, of the above described information, wiring, elements and terminals indicating connections with wiring of the higher layer are only information which is essential to the higher layer.

The presence of information other than wiring, elements, terminals, such as element information, may be desirable in certain cases, but this information is not always essential for the purpose of analyzing a circuit and, if necessary, such information can be acquired by opening a circuit diagram of a lower layer or by temporarily displaying the information in the higher layer to acquire the element information.

Now that the information on a lower layer which is required in a higher layer is identified, a specific embodiment for displaying the information in the higher layer will be explained.

Figure 3:
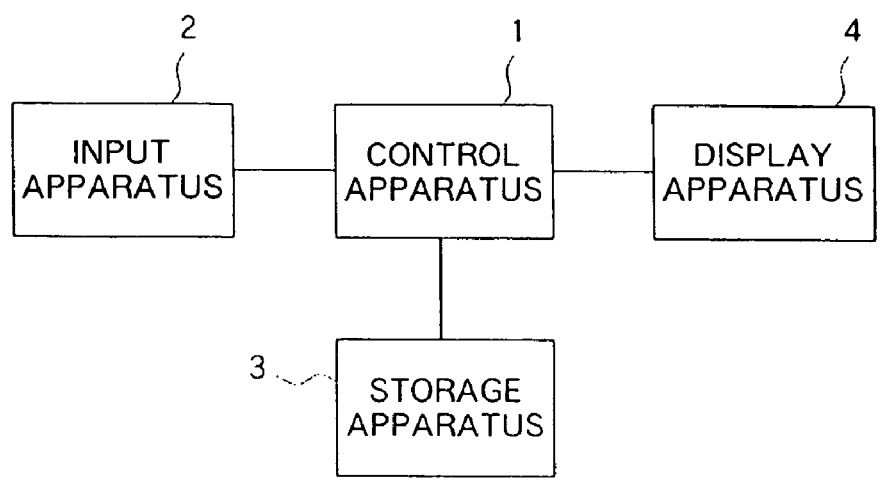
FIG. 3 illustrates the structure of a computer system making up the apparatus of the present invention.

The circuit diagram creating apparatus according to the present invention is constructed on a general computer system as shown in FIG. 3.

The computer system shown in FIG. 3 is constructed of input apparatus 2 such as a mouse and keyboard, control apparatus 1 which receives contents input from input apparatus 2 and executes a processing operation, storage apparatus 3 which stores a database, program and data according to an instruction from control apparatus 1 and display apparatus 4 such as a display or printer. The input apparatus also includes a recording medium (external storage apparatus) such as a hard disk and memory, and control apparatus 1 operates according to a program input from these devices and the present invention also includes the program for operating the computer system and the recording medium which stores the program.

Figure 4:
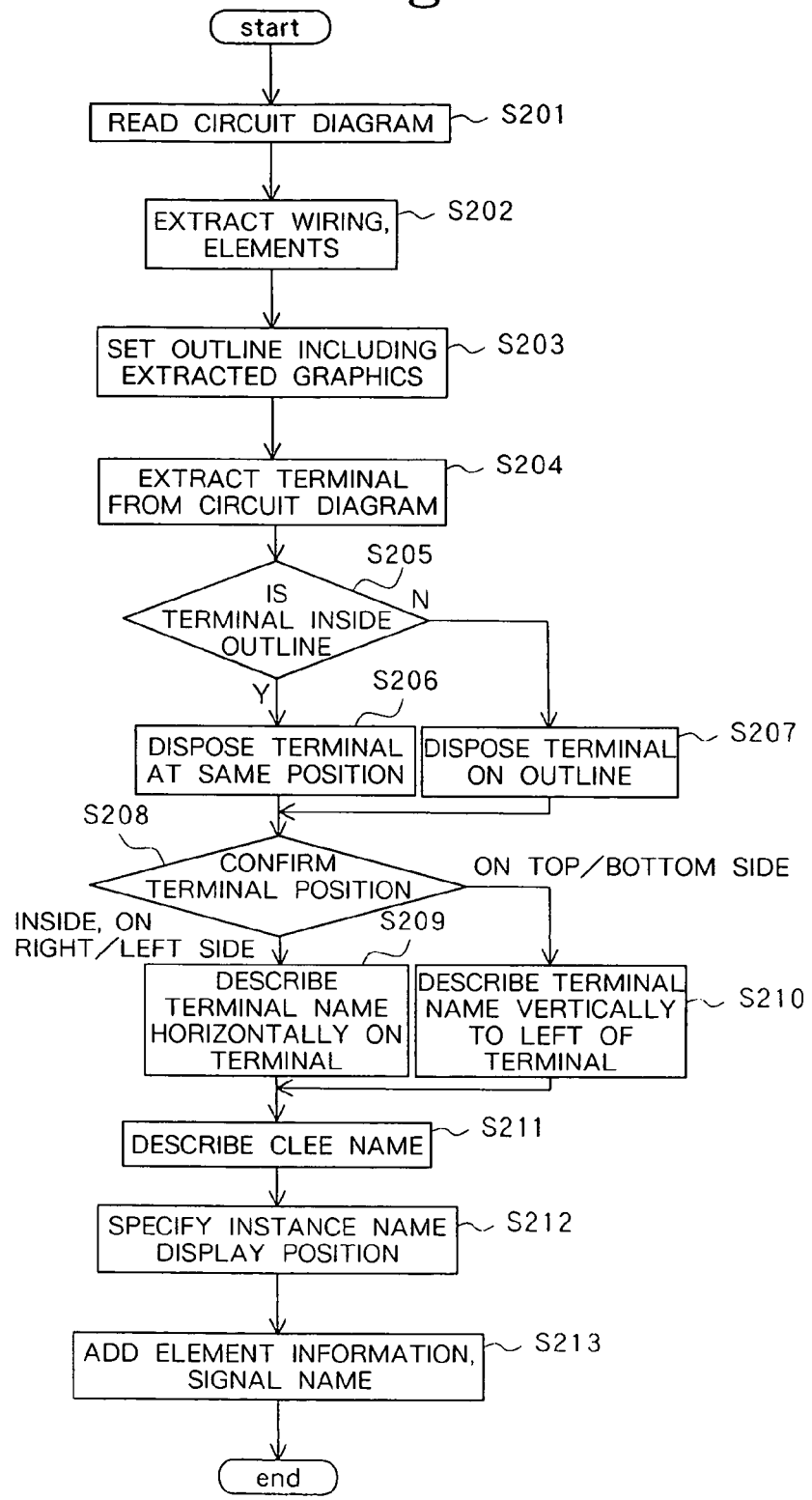
FIG. 4 is a flow chart showing the operation of the apparatus shown in FIG. 5.
Figure 5:
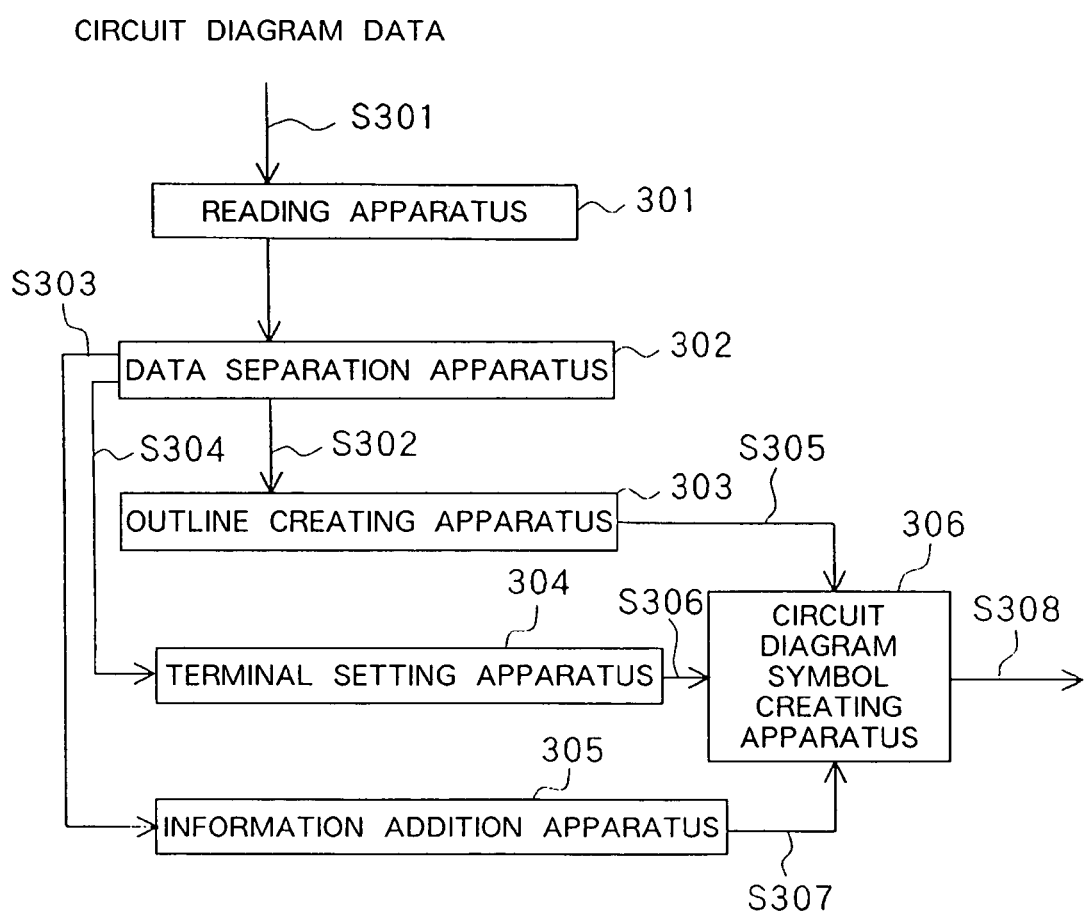
FIG. 5 is a block diagram showing the structure of an apparatus which creates symbol graphics according to the present invention constructed on the computer system shown in FIG. 3.

FIG. 5 is a block diagram showing the structure of the apparatus of the invention which creates symbol graphics (hereinafter referred to as "circuit diagram symbol") on the computer system shown in FIG. 3 and FIG. 4 is a flow chart showing the operation thereof.

The circuit diagram symbol creating apparatus shown in FIG. 5 is constructed of reading apparatus 301, data separation apparatus 302, outline creating apparatus 303, terminal setting apparatus 304, information addition apparatus 305 and circuit diagram symbol creating apparatus 306.

Reading apparatus 301 which serves as an interface with outside devices receives circuit diagram data S301 containing seed data of various separation apparatuses for creating a circuit diagram and sends this data to data separation apparatus 302. Data separation apparatus 302 sends signals S302 to S304 obtained by separating circuit diagram data S301 into various types of data to outline creating apparatus 303, terminal name setting apparatus 304 and information addition apparatus 305. Outline creating apparatus 303, terminal name setting apparatus 304 and information addition apparatus 305 determine an outline area to be displayed, a terminal name and its position, and additional information signals S305 to S307, from the various type of the received data respectively and send them to circuit diagram symbol creating apparatus 306. Circuit diagram symbol creating apparatus 306 creates circuit diagram symbol S308 from the outline area, terminal name and additional information sent.

FIG. 9 illustrates a list of types of information used in the present invention and displays priorities thereof. As shown in the figure, the present invention considers information on wiring, element and terminal as essential and assumes that this information should be necessarily displayed. Other information is given in descending order of priority information on a cell name and instance name, information on a terminal name of a cell, a wiring name, element information and information on an outline area, instance name of wiring element, element cell name, information on element terminal name, comment, cell frame and cell information.

Figure 13:
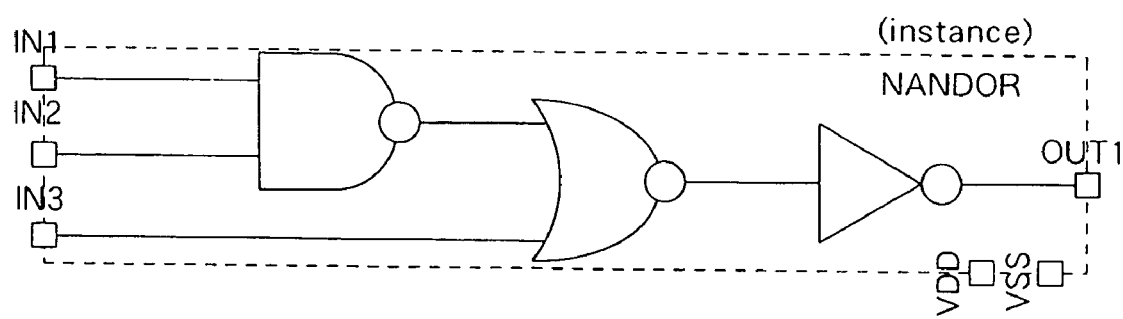
FIG. 13 illustrates an example of a circuit diagram symbol created by the present invention.

FIG. 13 illustrates a circuit diagram symbol with information necessary in a lower layer extracted. The procedure for creating the circuit diagram symbol will be explained below.

An outline of the creation procedure is as follows:
[1] Extract graphics information.
[2] Set an outline.
[3] Add terminals.
[4] Add cell information.

The present invention determines an outline area to be displayed from graphics information first and displays information which can be described in the outline area in the priority order shown in FIG. 9. The contents of respective steps [1] to [4] will be explained below with reference to FIG. 4.

[1] Extract Graphics Information

Of the aforementioned necessary information, wiring and elements are information required in a drawing in a lower layer and terminals indicating connections with wiring in a higher layer are information required when a lower-layer drawing is disposed in a higher-layer drawing, and therefore the procedure for extracting wiring and elements from the information in the lower layer will be explained first.

First, reading apparatus 301 reads a circuit diagram (step S201) and data separation apparatus 302 extracts wiring and elements (step S202). Since the circuit diagram in the lower layer is constructed of wiring, element information and element, etc., as shown in FIG. 11, it is only necessary to extract necessary information thereon, that is, the wiring and element to create a circuit diagram symbol. Of the two, for the wiring, the pattern of the circuit diagram is used as is. In regard to the method for using the pattern of the circuit diagram as is, for example, data having a wiring attribute of a circuit diagram sheet may be copied to a circuit diagram information sheet. For the element, the pattern of the circuit diagram may also be used as is in the same way as for the wiring.

The wiring name and element information are not given detailed description described in detail. This information is information associated with the wiring and the element and is copied at the same time when data is copied from the circuit diagram, but it is usually possible to select whether this information is to be shown/hidden, and therefore by choosing to hide all information, it is possible to obtain only the graphics part excluding the wiring name and element information.

Here, what should be noted is element information. The element information is information associated with an element disposed in the lower layer and it is a general practice to describe the information which is considered to be necessary for recognition of the circuit alongside a symbol. As shown in FIG. 14, for example, there are various types for this description method; a type such as a MOS with a variable constant for which a constant is given in a higher layer and a type such as a logic gate with a fixed constant for which a constant is given in a lower layer.

In the case of a type of element such as a logic gate with a fixed constant for which a constant is given in a lower layer, it is necessary to describe a constant as a character in a symbol graphics of an element in the lower layer. Therefore, since it is difficult to specify this constant part in the higher layer, when this constant part is deleted, all the character parts of the symbol graphics in the lower layer are deleted as shown in FIG. 15.

On the other hand, in the case of a type of element such as a MOS with a variable constant for which a constant is given in a higher layer, no constant is directly described in a symbol in the lower layer and only the location at which the constant given in the higher layer is displayed and information such as a character size are described. Furthermore, it is normally possible to set whether to show or hide these constants and information in the higher-layer, and therefore all the information is set to be hidden.

In this way, it is possible to put together the above described two parts; the element whose constant is hidden and the graphics part in order to obtain a graphics part of the circuit diagram symbol as shown in FIG. 15 used in the present invention.

[2] Set Outline

Figure 16:
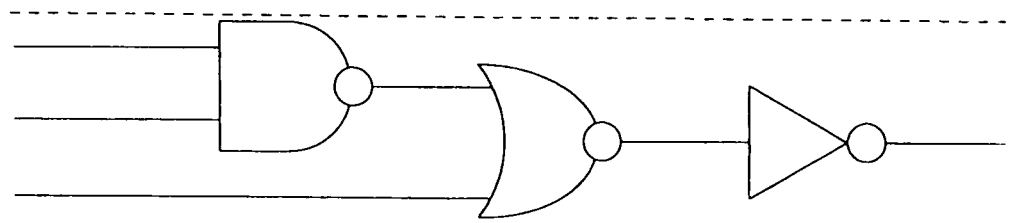
FIG. 16 illustrates an outline area setting example.
Figure 17:
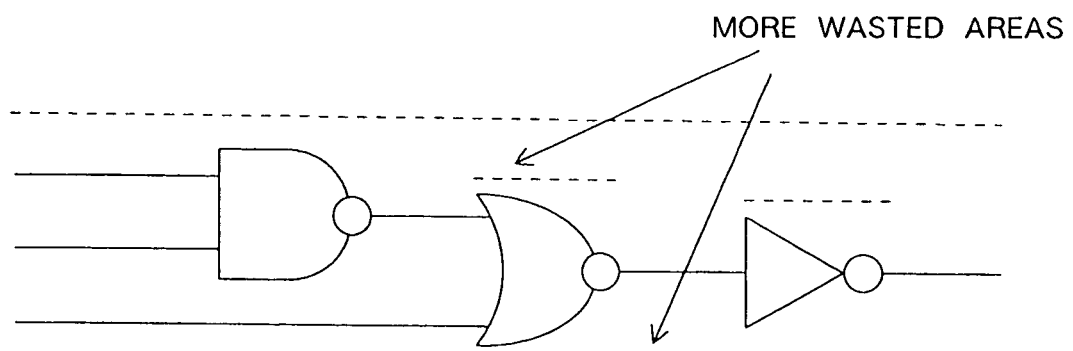
FIG. 17 illustrates an outline area example before improvement.

Next, outline creating apparatus 303 carries out an operation of defining an outline area of a circuit diagram symbol (step S203). As shown in FIG. 16, the area of a circuit diagram symbol is an area including all wiring and elements that are included in the circuit diagram symbol. For this reason, assume the outline area is a maximum area including all the following information.
(1) All Wiring Graphics
(2) Graphics Part of All Symbol Graphics Of (1), (2), (2) indicates an area of a circuit diagram symbol except a constant part. When a symbol area is set in an element with a fixed constant, an area including the element constant may be considered as a symbol area. If this area is set in the circuit diagram symbol area, as shown in FIG. 17, blank areas are also set as such areas, which result in wasted space. For this reason, in such a case, as shown in FIG. 15, only the graphics part without the constant part is internally redefined as a symbol area, which is then set as the area in (2) above.

[3] Add Terminal

Figure 18:
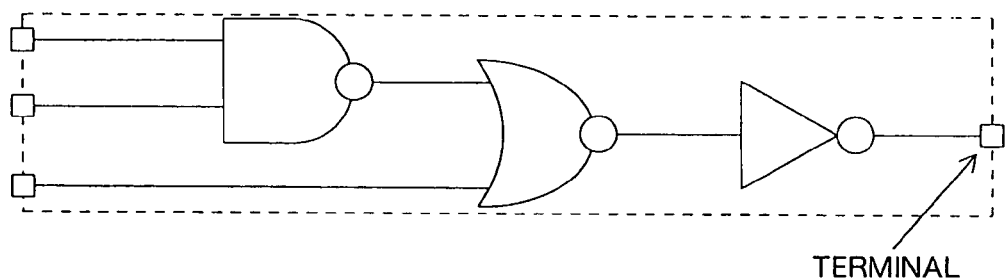
FIG. 18 illustrates an example of the addition of a terminal.

After the outline area of circuit diagram symbol is defined, connection terminals are defined. As described at the beginning, the connection terminals are necessary to define connections with a higher layer. Since the connection terminals are often arranged on some wiring of a circuit diagram, FIG. 18 defines such parts as the connection terminals.

Figure 19:
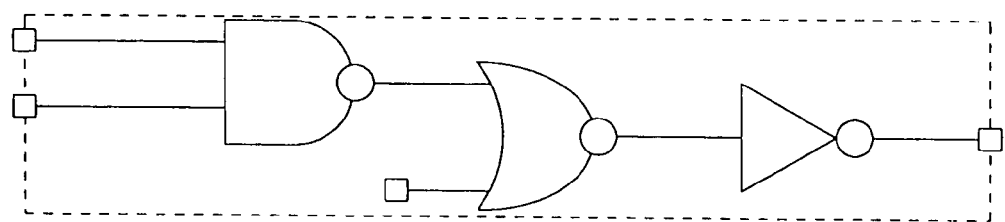
FIG. 19 illustrates an example where a terminal exists within an outline area.

The shape of the terminals need not be the same as that of a lower-layer circuit diagram, and changing the shape causes no problem as in the case of normal symbol graphics. As for the position at which the terminal is defined, when a circuit diagram is created, terminals are described at the edge of the circuit, and so the terminals are often located on an outline. However, depending on the way the circuit diagram is created, the terminal may also be described inside the outline area as shown in FIG. 19. Thus, the terminal is different from other symbol graphics in that when the terminal is described inside the outline area, it is necessary to draw wiring up to that part in the higher layer.

With regard to a specific procedure for adding terminals, terminal setting apparatus 304 extracts a terminal from signal S302 from data separation apparatus 302 first (step S204) and confirms whether the terminal extracted by circuit diagram symbol creating apparatus 306 is within the outline area set in step S203 or not (step S205). When the extracted terminal is within the outline area, the terminal is disposed at the same position (step S206), and then the terminal position is confirmed (step S208). When it is confirmed that the terminal extracted in step S205 is not within the outline area, the extracted terminal is disposed on the outline (step S207), and then the terminal position is confirmed (step S208).

When it is confirmed in step S208 that the terminal position is within the outline area or on the right or left side, the terminal name is described horizontally on the terminal (step S209) and when it is confirmed in step S208 that the terminal position is on the top or bottom side of the outline area, the terminal name is described vertically to the left of the terminal (step S210).

For a normal symbol, the terminal name is always described for a connection terminal. In the case of a circuit diagram symbol, the terminal name may be omitted, but since a description of the terminal name is often helpful, the method of describing the terminal name will be explained.

Figure 20:
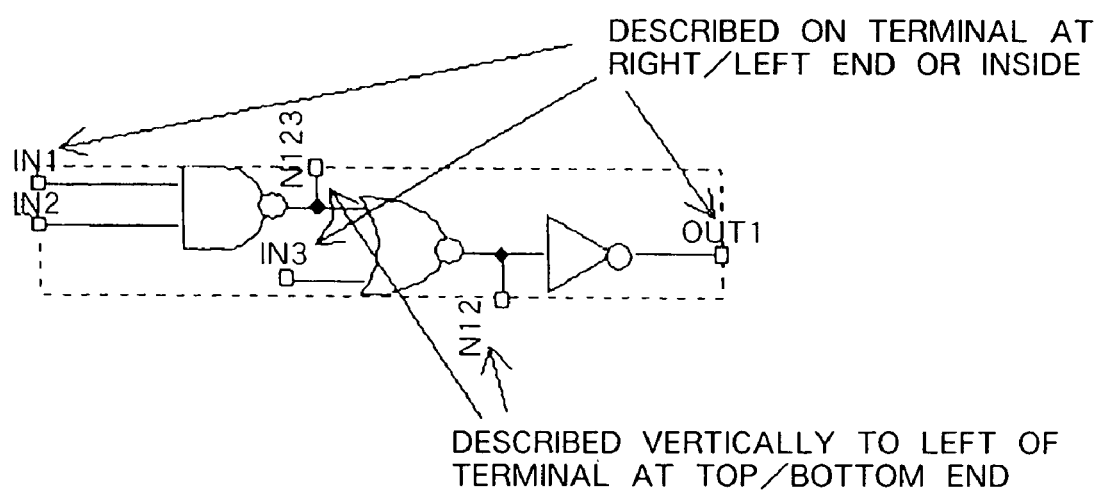
FIG. 20 illustrates descriptive examples of terminal names.

When the terminal name is described, the terminal name is often disposed to the right or left of the connection terminal in normal symbol graphics, but this may overlap with wiring and is inappropriate in the case of a circuit diagram symbol. For this reason, as shown in FIG. 20, for example, it can be set as a rule that in the case of a connection terminal disposed at the right or left end of the outline area or inside the outline area, the terminal name should be disposed at the top of the terminal and in the case of a connection terminal disposed at a top or bottom end, the terminal name should be disposed to the left of the terminal.

Figure 21A:
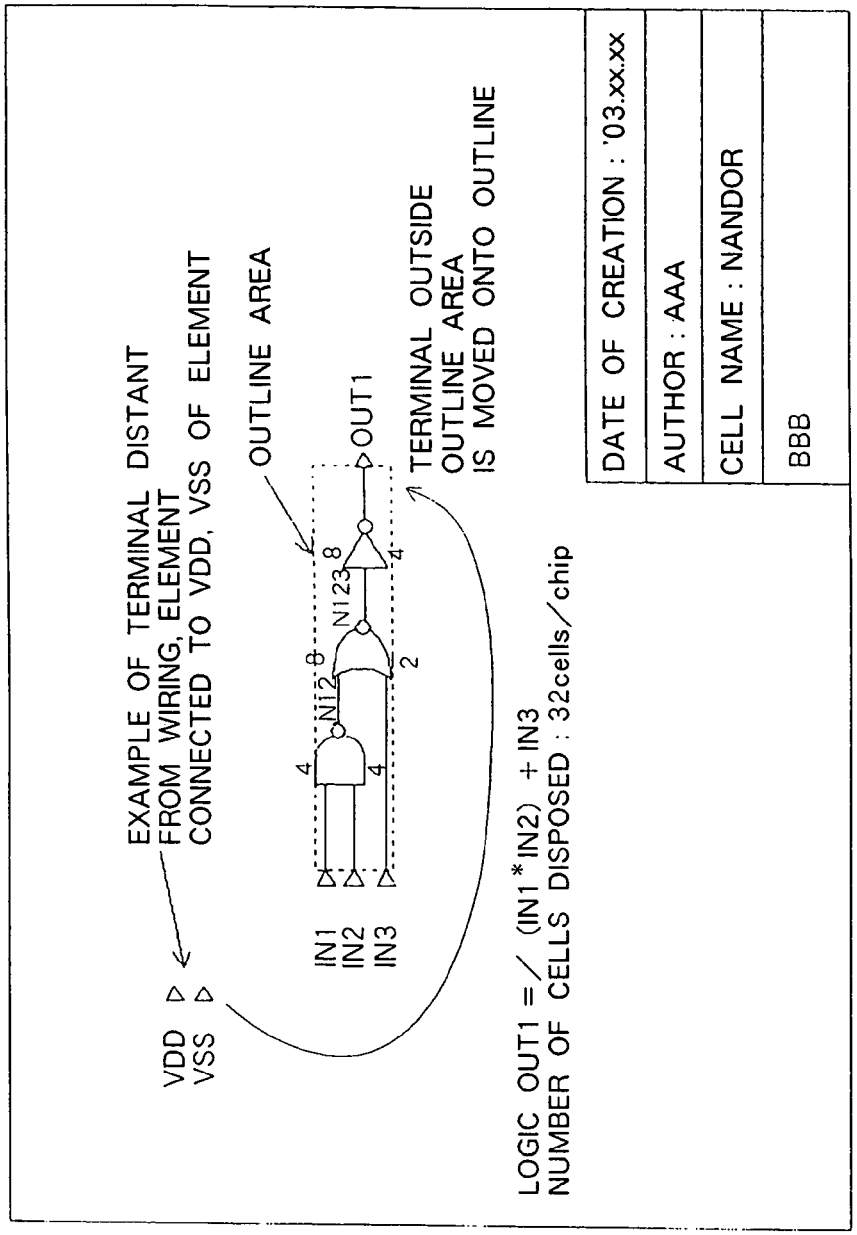
FIG. 21A and FIG. 21B illustrate an example where terminals exist outside the outline area and a countermeasure example therefor respectively.

However, since the terminal name is the same as an internal signal name, as shown in FIG. 21A, there may be a terminal which is not connected to any wiring. For example, when a power supply is wired, wiring in the circuit diagram becomes excessive and degrades viewability, and therefore wiring is often omitted and only its terminals are arranged in the circuit diagram as appropriate. In this case, since the terminal positions exist outside the preset outline area, if the terminal positions are set at their original positions, the terminals are set outside the outline area, which makes their relationship with the circuit diagram symbol unclear. On the contrary, if the outline area is set so as to include the original positions, the wasted area of the circuit diagram symbol increases and when a higher-layer circuit diagram is created using the circuit diagram symbol, the readability of the circuit diagram may deteriorate. For this reason, if the terminal exists outside such an outline area, it is necessary to move the terminal onto the outline or inside the outline area.

Figure 21B:
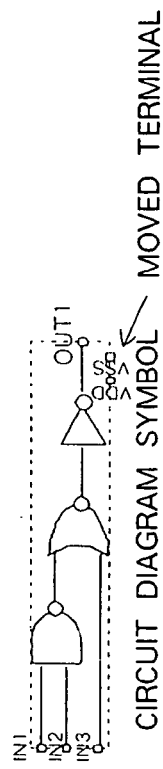

When the terminal is moved onto the outline or inside the outline area, it is also possible to find out a free space in the circuit diagram symbol and dispose the terminal at an optimal place, but when the terminal is automatically moved, good readability cannot be guaranteed. Therefore, this may be set as a rule for the time being and as shown in FIG. 21B, the terminals may be disposed at specific positions on the cell frame, arranged, for example, at bottom right in alphabetical order. If the readability is still poor, their arrangement may be changed manually.

[4] Add Cell Information

Next, the circuit diagram symbol creating apparatus gives a cell name and instance name based on signal S307 from information addition apparatus 305 (steps S211, S212). When a symbol of a cell or circuit diagram symbol of a lower layer is disposed in a higher layer, the cell name of the symbol and the instance name are important information. Though the cell name and instance name are not included in the aforementioned essential information, that information is often required in the higher layer, and so the method of adding such information will be explained.

Figure 22:
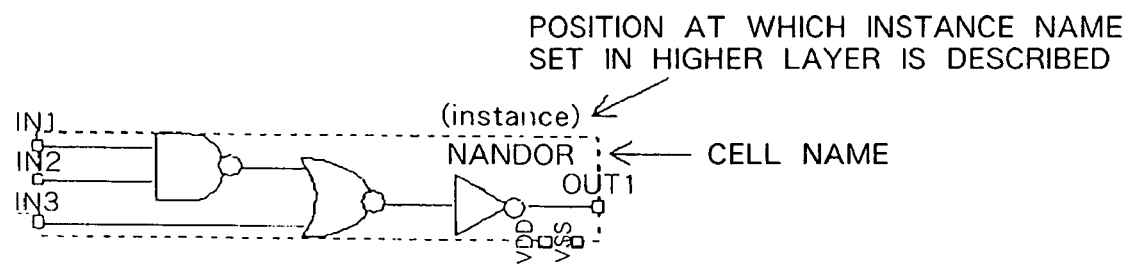
FIG. 22 illustrates descriptive examples of a cell name and instance name.

The cell name here refers to a circuit diagram name of a cell in the lower layer and the instance name refers to information added to identify the element when a net list is created from the circuit diagram and all instances are given different names for each element. Therefore, even if a plurality of identical cells exist, their instance names are different and it is possible to prevent them from being confused with other elements when a net list is created. For this cell name and instance name, their placement positions are specified as with normal symbols. Here, as shown in FIG. 22, for example, it can be established as a rule that the instance name should be set at the top right outside the outline area and the cell name should be set at the top right inside the outline area. Finally, element information and signal name are additionally described (step S213).

Figure 8:
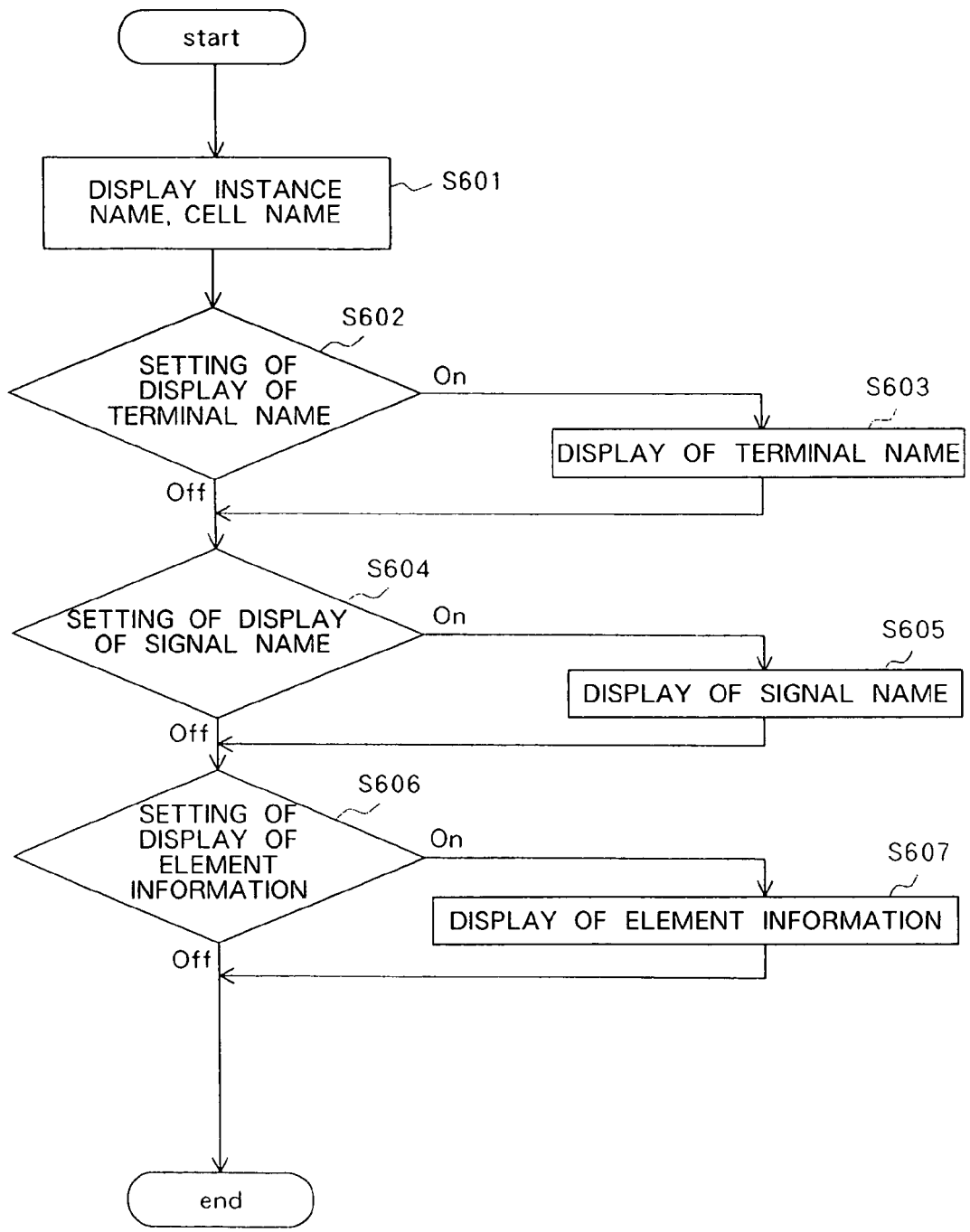
FIG. 8 is a flow chart showing details of the operation for displaying a circuit diagram symbol of the lower circuit diagram in steps S211, S213 shown in FIG. 4.

FIG. 8 is a flow chart showing details of the operation of displaying a circuit diagram symbol in the low-layer circuit diagram in steps S211, S213 shown in FIG. 4.

When displaying the instance name and cell name of the circuit diagram symbol (step S601), circuit diagram symbol apparatus 306 confirms whether the terminal name is set to be displayed or not, whether the signal name is set to be displayed or not and whether the element information is set to be displayed or not (steps S602, S604, S605) and displays the settings (steps S603, S605, S606).

The descriptions of adding the cell name, instance name, element information and signal name in steps S211 to S213 above may also be adapted in such a way that when the circuit diagram symbol creating apparatus determines whether it is possible to write data in an outline area or not and if it is not possible to display all the data, information is displayed in order of descending priority shown in FIG. 9 and information with low priority is not displayed. Adopting such a structure allows information with high priority to be reliably displayed.

Figure 1:
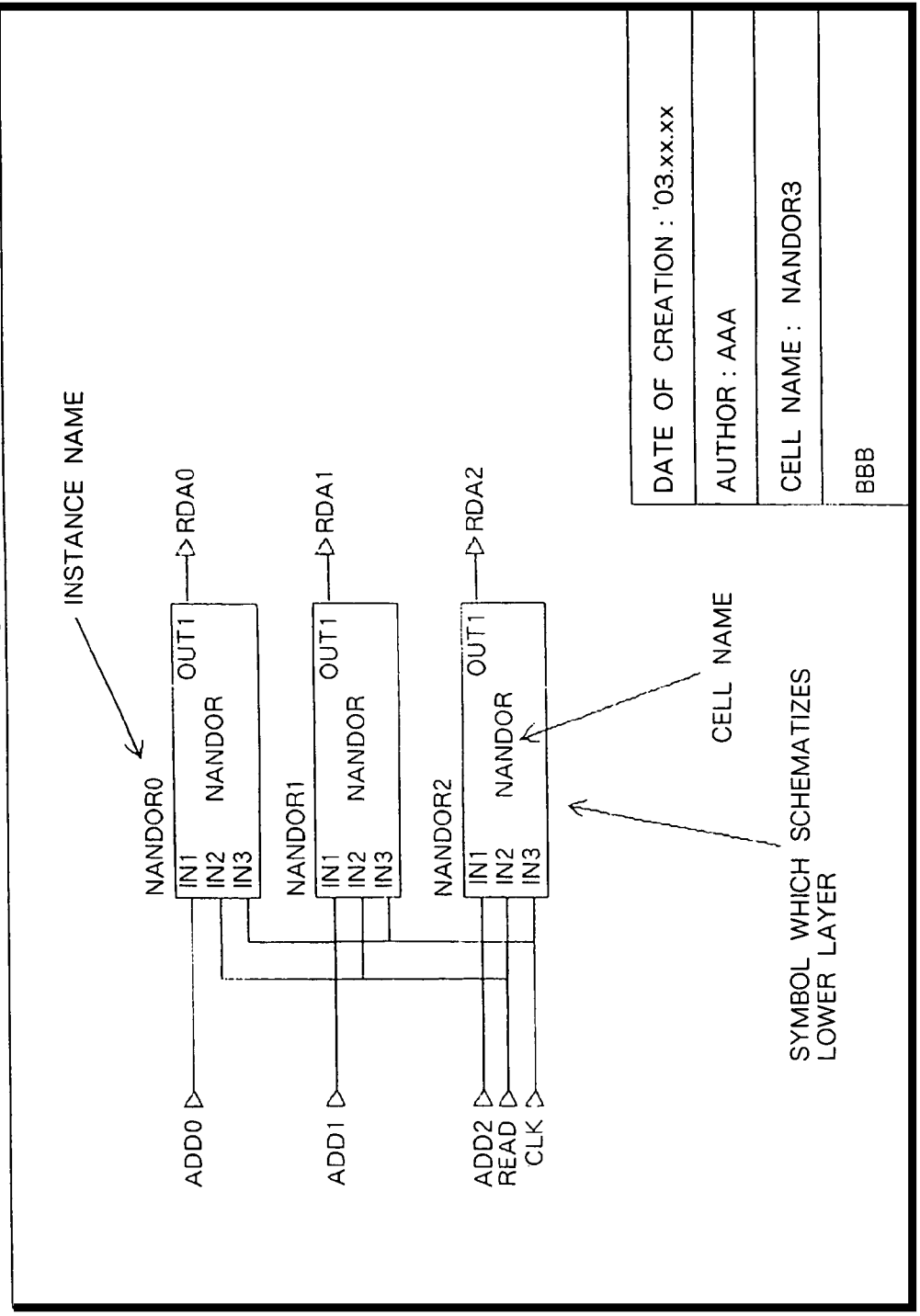
FIG. 1 illustrates an example of a conventional higher-layer circuit diagram.
Figure 2:
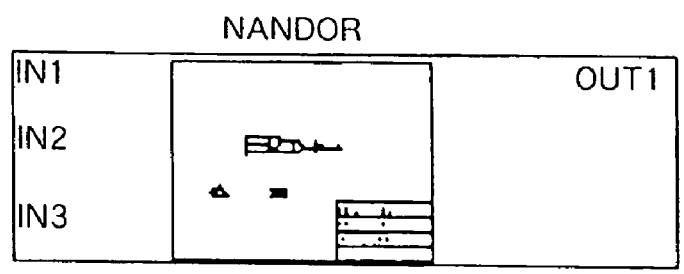
FIG. 2 illustrates a conventional example where a lower layer is recognized from a higher layer.
Figure 10:
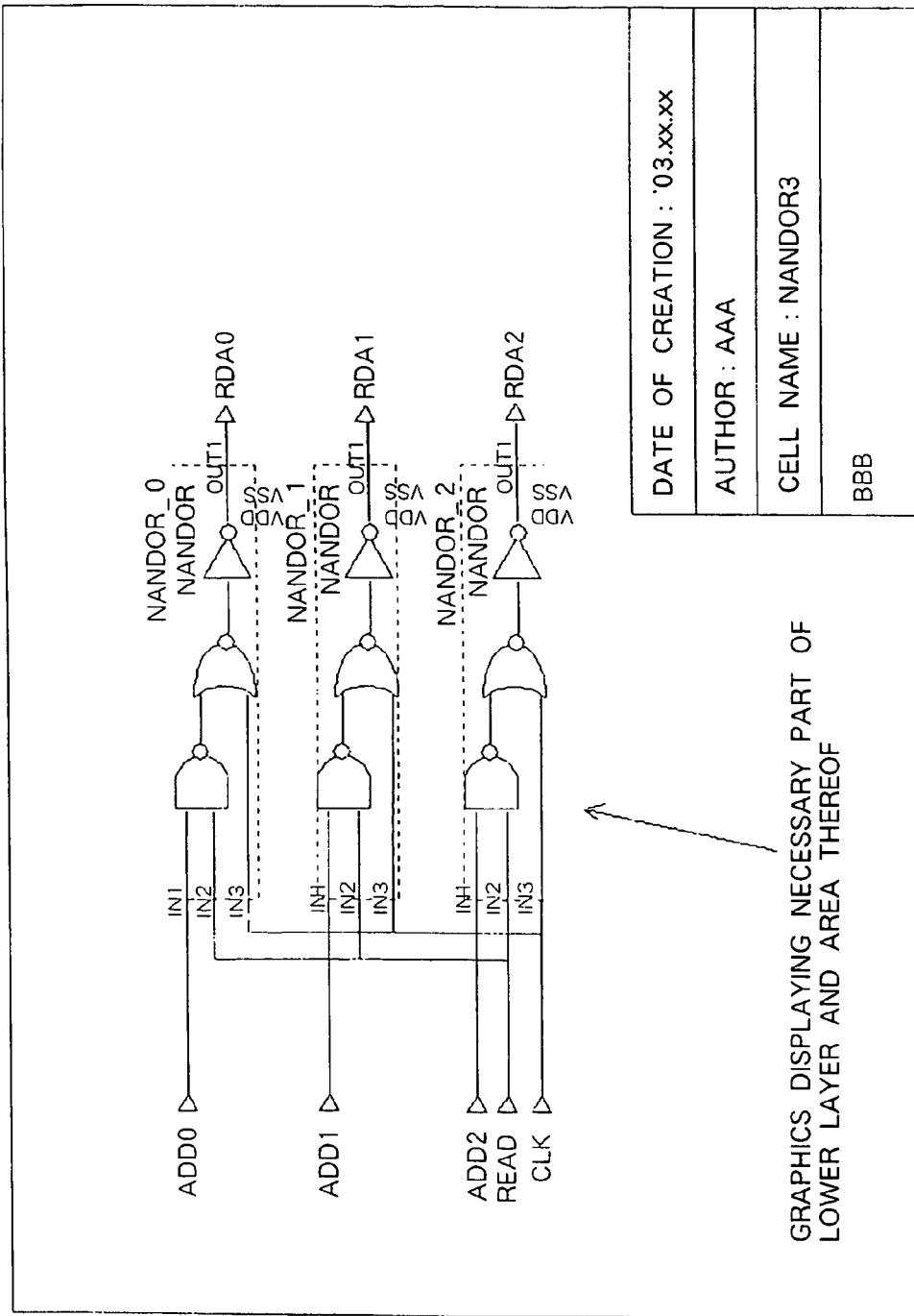
FIG. 10 illustrates an embodiment of the present invention.

Using the above described means, it is possible to create a circuit diagram symbol shown in FIG. 13 and disposing this in a higher-layer circuit diagram makes it possible to describe a circuit diagram with high readability as shown in FIG. 10. Compared to the conventional circuit diagram made up of symbols schematized as rectangular boxes shown in FIG. 1, it is obvious that readability has been improved considerably.

Figure 23:
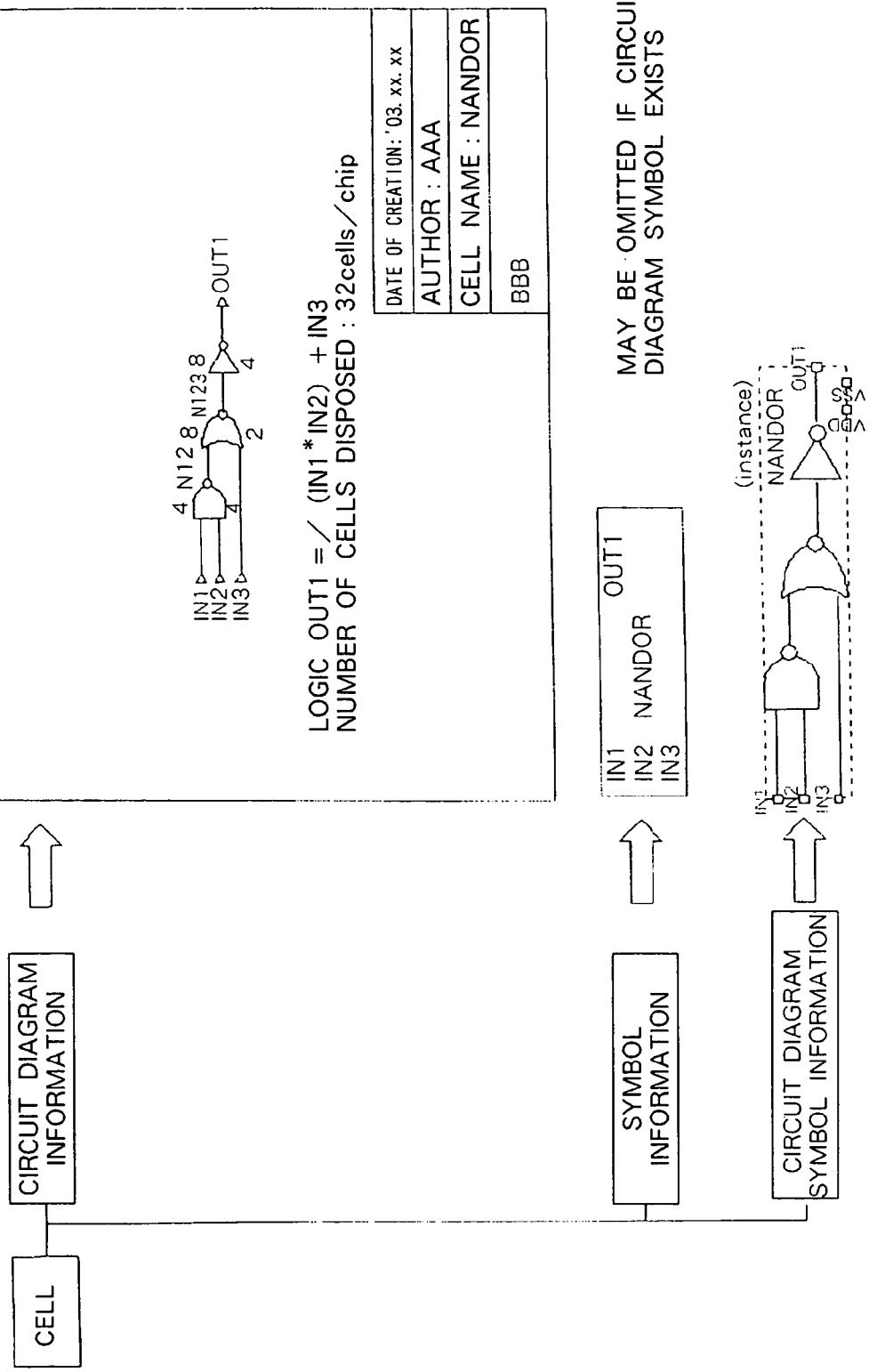
FIG. 23 illustrates an example of information stored in a circuit diagram editor when a circuit diagram symbol is added.
Figure 24:
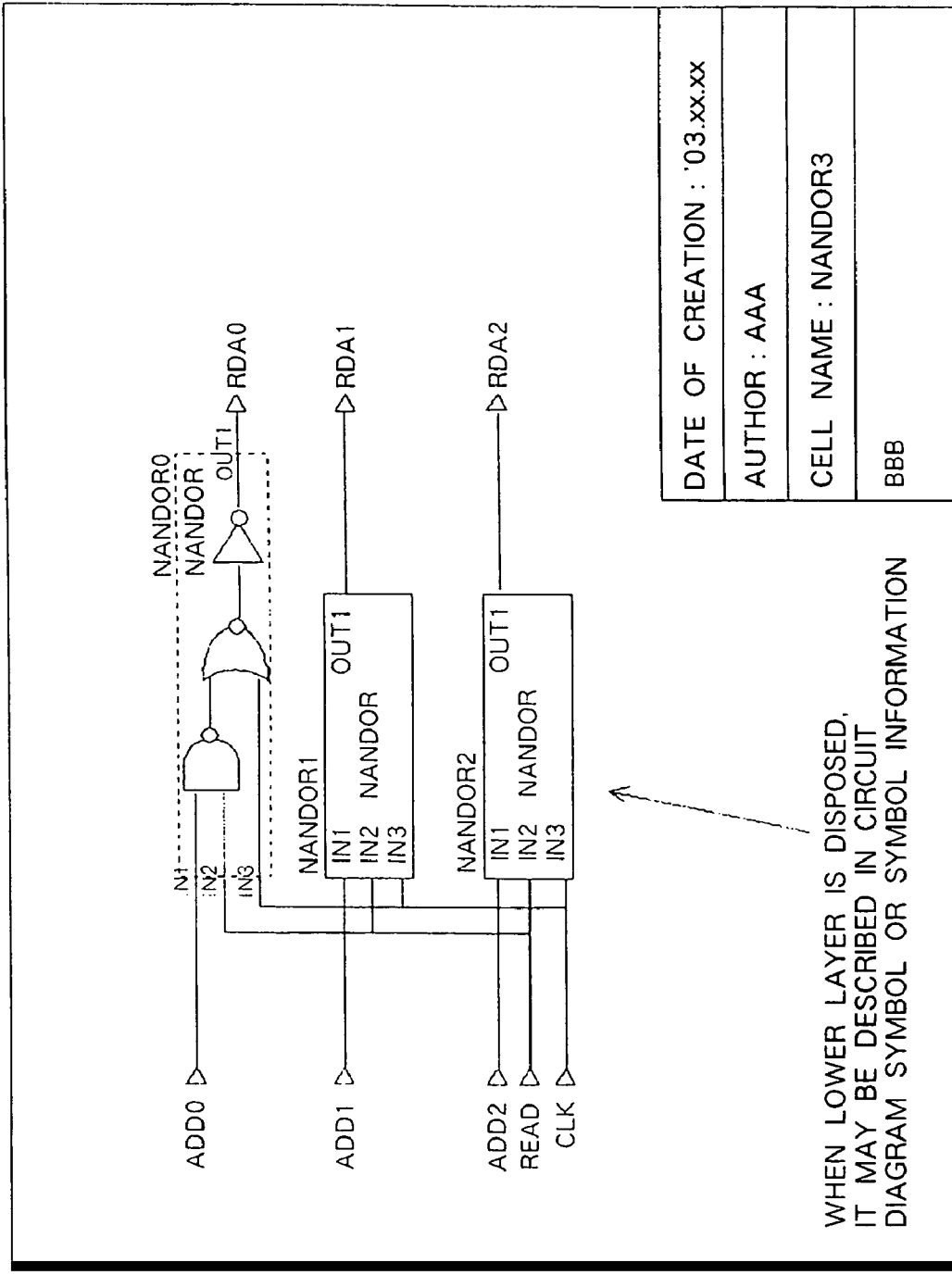
FIG. 24 illustrates an example where a circuit diagram symbol is mixed with conventional symbols.

Assume that creation process is basically designed to be initiated by a command when it is newly created, and after a circuit diagram symbol is created, the result is stored in another information sheet. The circuit diagram symbol may be used as replacement for symbol graphics or as shown in FIG. 23, the circuit diagram symbols may also be provided apart from symbol information as a third sheet. Furthermore, as shown in FIG. 24, there will be no problem if symbols of the conventional specification are used in combination with circuit diagram symbols.

Figure 25:
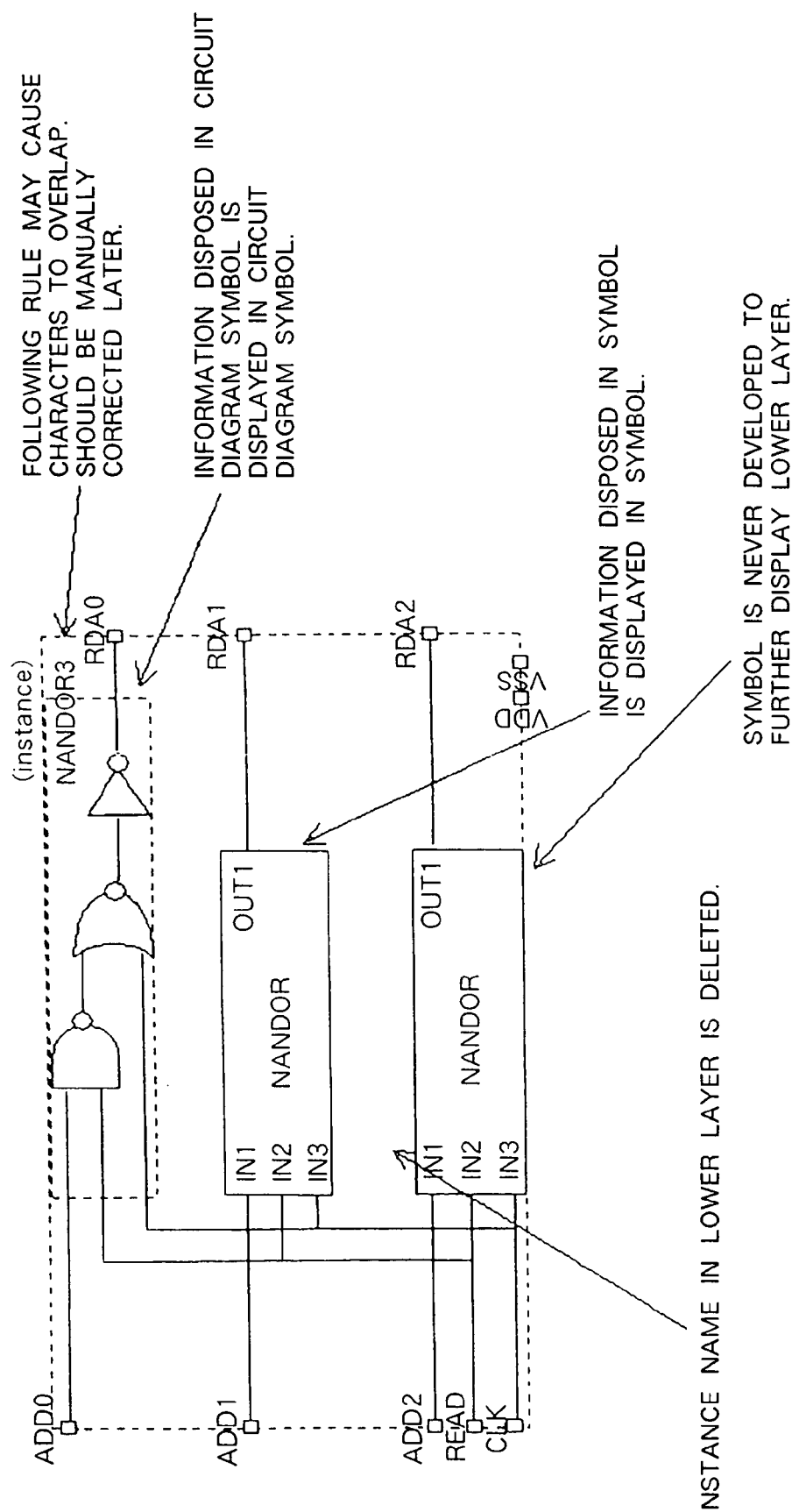
FIG. 25 illustrates an example where a circuit diagram symbol is applied to a plurality of layers.

A circuit diagram symbol can be generated across a plurality of layers. FIG. 25 shows an example where a circuit diagram symbol of FIG. 24 is created. The same means as that used in the method of creating a circuit diagram symbol described so far are used in this case, too.

Figure 26:
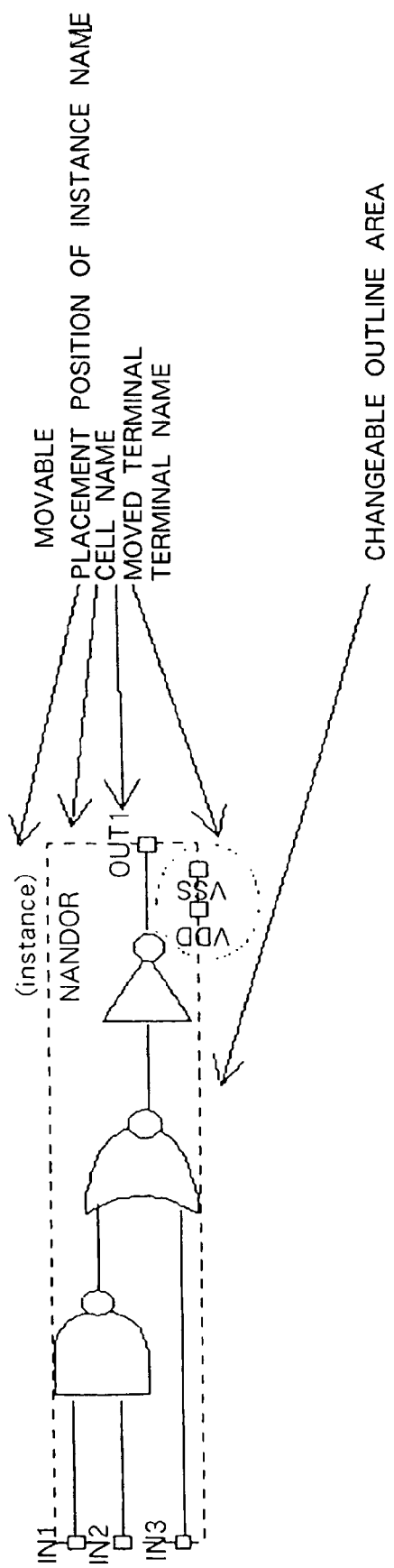
FIG. 26 illustrates a list of modifiable locations of a circuit diagram symbol.

When circuit diagram information on a cell having a circuit diagram symbol is modified, assume that the circuit diagram symbol is also modified at the same time. Therefore, unlike other information sheets, it is impossible to manually modify the circuit diagram symbol in detail. However, as shown in FIG. 26, assume that the terminal name, placement position of the instance name, moved terminals and outline area can be moved and modified in order to improve readability of the circuit diagram symbol. When unlock the locking to disable manual modification, assume that all information can be modified, but there is no link with the circuit diagram after unlocking.

When a connection terminal is changed, its connection to a circuit diagram symbol which has already been disposed in the higher layer is changed, and therefore note that connection terminal positions cannot be changed in the lower layer after the circuit diagram symbol is created. Terminal names may be changed. However, it is often the case that inability to change connection terminal positions, when a large scale circuit modification occurs, when the disabled manual modification mode is unlocked causes difficulty, and therefore assume that the connection terminal positions may be modified by unlocking.

FIG. 27A describes a summary of the above described rules. When connection terminal positions are changed by unlocking, as shown in FIG. 27B, a link between the circuit diagram symbol and circuit diagram is removed and a symbol (hatching is applied to the whole diagram in the example shown in FIG. 27B) indicating that the circuit diagram has been changed appears in the already disposed circuit diagram symbols in the higher layer. Furthermore, when an unusable circuit diagram symbol is disposed in a higher layer, a symbol such as a x mark indicating that fact is affixed to the entire circuit diagram symbol as shown in FIG. 27.

Figure 6:
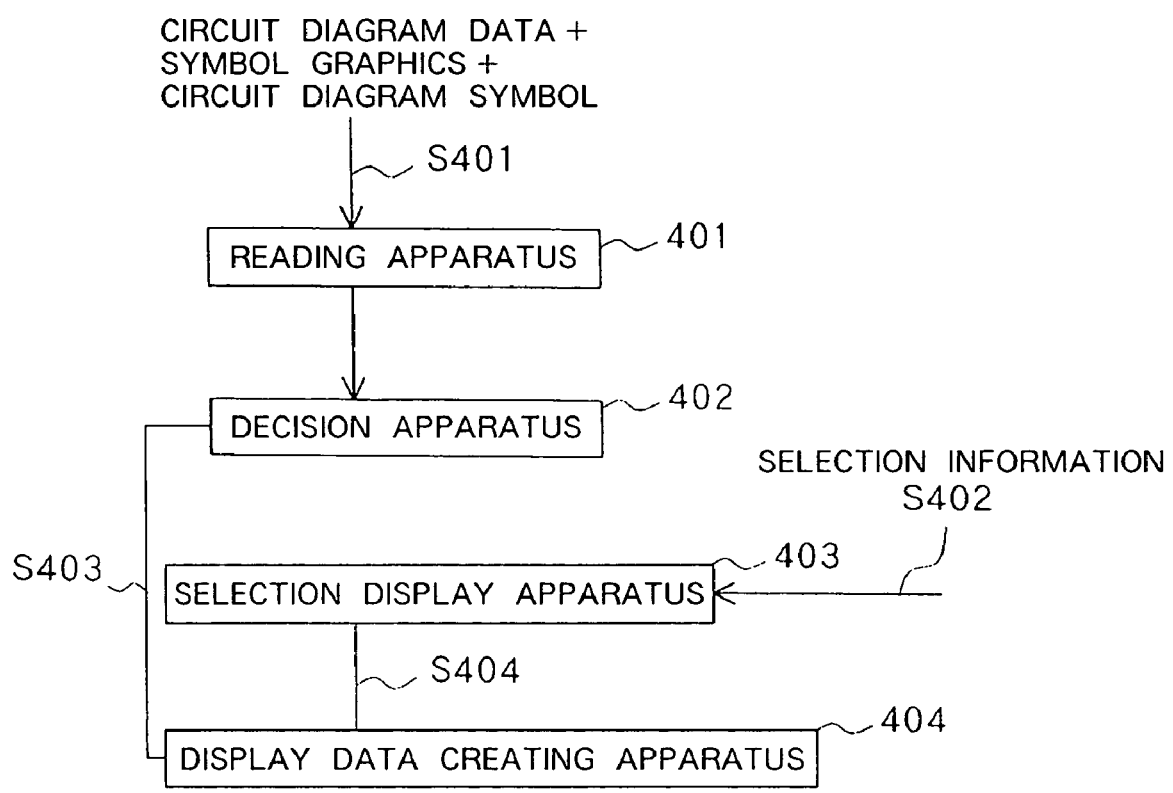
FIG. 6 is a block diagram showing the structure of an apparatus which creates display data from a circuit diagram symbol.

FIG. 6 is a block diagram showing the structure of an apparatus which creates display data from the circuit diagram symbol created as described above and FIG. 7 is a flow chart showing the operation thereof.

The apparatus shown in FIG. 6 is constructed of reading apparatus 401, decision apparatus 402, selection display apparatus 403 and display data creating apparatus 404.

Reading apparatus 401 reads higher-layer circuit diagram data, lower-layer circuit diagram symbol and data S401 including the circuit diagram symbol of the lower-layer circuit diagram created by the apparatus shown in FIG. 5 and sends this data to decision apparatus 402. Decision apparatus 402 decides the type of the input data and sends signal S403 indicating the type of the input data to display data creating apparatus 404. The selection display apparatus receives selection information S402 for selecting data to be displayed from the user of the apparatus and sends signal S404 indicating the contents to display data creating apparatus 404.

Here, selection information S402 displays the manually input contents. The present invention displays information in the priority order shown in FIG. 9, but if the user of the apparatus gives an instruction, this instruction is given highest priority. Furthermore, in the case where manually modified information is included as described using FIG. 26, selection information S402 indicating the creation result is input and the contents are reflected.

Figure 7:
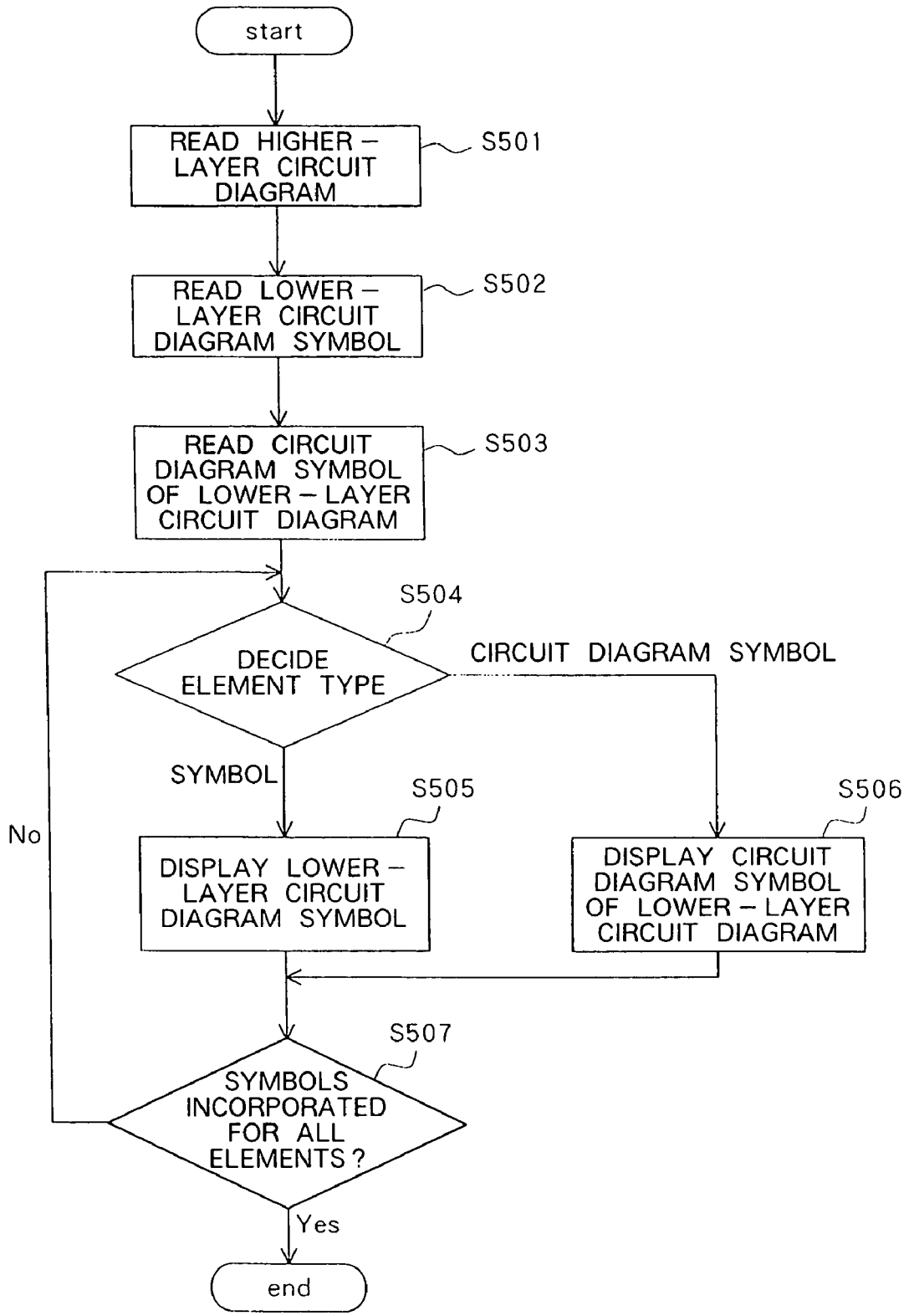
FIG. 7 is a flow chart showing the operation of the apparatus shown in FIG. 6.

Next, the operation of the apparatus shown in FIG. 6 will be explained with reference to FIG. 7.

Reading apparatus 401 reads the higher-layer circuit diagram data, symbol of the lower-layer circuit diagram and circuit diagram symbol created by the apparatus shown in FIG. 5 (steps S501 to step S503) and sends them to decision apparatus 402. Decision apparatus 402 decides the type of each piece of data, confirms whether a circuit diagram symbol has been created or only a symbol has been prepared for the element for which the higher-layer circuit diagram is displayed (step S504) and sends the result to display data creating apparatus 404. When it is confirmed in step S504 that only the symbol has been prepared, display data creating apparatus 404 displays only the symbol incorporated in the corresponding element in the higher-layer circuit diagram (step S505) and when it is confirmed in step S504 that the circuit diagram symbol has been created, it displays the circuit diagram symbol incorporated in the corresponding element in the higher-layer circuit diagram (step S506). Then, it is confirmed whether symbols or circuit diagram symbols have been incorporated for all the elements (step S507) and if the incorporation is not completed for all the elements, the apparatus goes back to step S504 and repeats the above described operation. If it is confirmed in step S507 that the incorporation of the symbols or circuit diagram symbols is completed for all the elements, the operation ends here.

Figure 28:
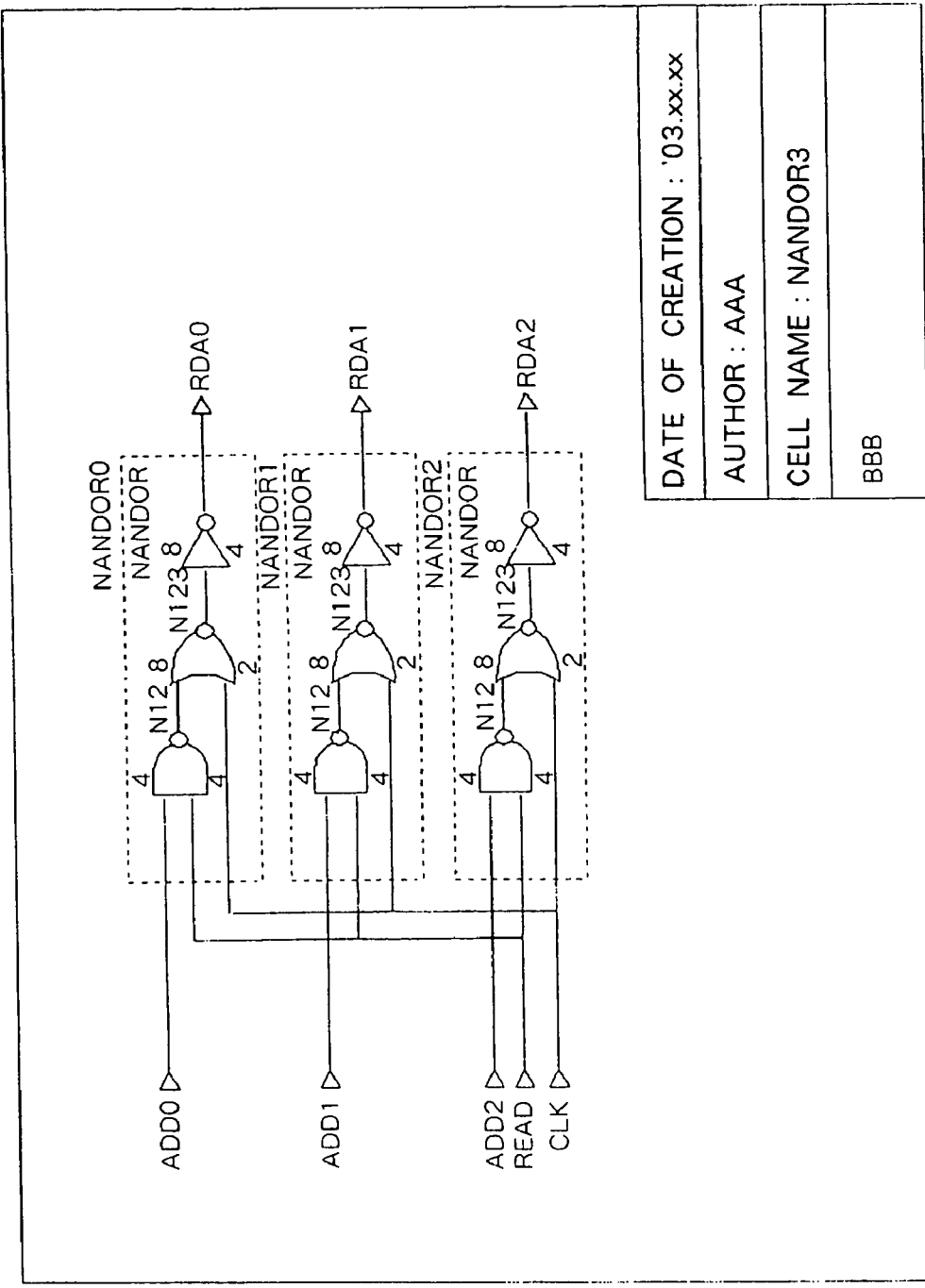
FIG. 28 illustrates an example where display information is increased.

Examples of the present invention have been shown so far, but there is no problem even if the contents thereof are changed within a range that does not depart from the present invention. For example, wiring names and element information have been described as being hidden in a circuit diagram symbol in principle, but as shown in FIG. 28, they can also be displayed in the same way as in a circuit diagram with matter that is expressed as a matter. In that case, it is necessary to change them so that the outline area of the symbol graphics including the element information part may be regarded as the range within which the outline area is defined. In this case, an instance name in the lower layer circuit diagram is not required in the higher layer under any circumstances and a diagram with better viewability can be created when the instance name is hidden and the constant-related matter is displayed. Therefore, a constant-related matter is mainly displayed in the element information.

Or, it is also possible to make a rule to hide wiring names and element information in principle and make it possible to select whether to show or hide the wiring names, element information in the lower layer from the higher layer all together. In that case, unlike the wiring names, the element information has many types, and therefore, for example, only MOS constants are described so that the type of -information to be displayed can be set.

The outline area may also be specified to be hidden when a circuit diagram symbol is disposed in the higher layer. Or, only the outline area in the lower layer may be specified to be hidden.

What is claimed is:

1. A circuit diagram creating method for creating a layered electric circuit diagram from data indicating an electric circuit, comprising:
    determining a size of an outline area of a cell to be displayed based on wiring information and graphics information related to the cell to be displayed, which are data indicating said electric circuit for symbol graphics of a lower hierarchical layer; wherein the outline area defines an area, on a diagram of a higher hierarchical layer, in which the cell, which is a cell of a lower hierarchical layer, is illustrated;
    displaying, on a display device, wiring symbols, element information, and element symbols of the cell of the lower hierarchical layer on the circuit diagram so as not to go beyond an outline area of the cell;
    determining a display priority for each of various types of information making up the data indicating the electric circuit displayed as symbol graphics;
    displaying information of the cell in descending order of priority within the outline area of the cell; and
    not displaying information of the cell on the circuit diagram when the information cannot be contained within the outline area of the cell.

2. The circuit diagram creating method according to claim 1, wherein, when a position of a terminal indicated by terminal information which is data indicating the electric circuit, is inside an outline area of the cell, the terminal is symbolically displayed at the position inside the outline area of the cell, and when the position of a terminal is outside the outline area of the cell, the terminal is symbolically displayed on the outline of the cell.

3. A computer-readable medium storing therein instructions which cause a computer to execute the circuit diagram creating method according to claim 1.

4. The circuit diagram creating method according to claim 1, further comprising:
    displaying at least one first cell of a lower hierarchical layer, and displaying element symbols within an outline area of the at least one first cell; and
    displaying at least one second cell of a lower hierarchical layer, and displaying no element symbols within an outline area of the at least one second cell.

5. A circuit diagram creating apparatus which creates a layered electric circuit diagram from data indicating an electric circuit, the apparatus comprising:
    a reading apparatus which receives data indicating said electric circuit;
    a data separation apparatus which separates information making up the data indicating said electric circuit into various types of information, including at least element symbols, element information, and wiring symbols;
    an outline creating apparatus which determines a size of an outline area of a cell to be displayed based on wiring information and graphics information related to the cell to be displayed, which are data indicating said electric circuit, wherein the outline area defines an area, on the layered electric circuit diagram, in which the cell, which is a cell of a lower hierarchical layer, is illustrated;
    an information addition apparatus which extracts information from the various types of information;
    a circuit diagram symbol creating apparatus which receives information from the outline creating apparatus and from the information addition apparatus and creates data therefrom for displaying the layered electric circuit diagram, such that wiring symbols, element symbols, and element information of the cell of the lower hierarchical layer is not displayed on the circuit diagram outside the outline area of the cell created by said outline creating apparatus; and a terminal setting apparatus which extracts terminal data indicating a terminal and position of the terminal from the various types of information,
wherein the circuit diagram symbol creating apparatus further receives terminal data from the terminal setting apparatus, and when a position of the terminal indicated by the terminal information is inside the outline area of the cell, data is created to symbolically display the terminal at the position inside the outline area of the cell, and when the terminal cannot be contained within the outline area, data is created to symbolically display the terminal on the outline of the cell.

6. The circuit diagram creating apparatus according to claim 5, wherein the circuit diagram symbol creating apparatus determines a display priority for each of the various types of information, creates data for displaying information of the cell in descending order of priority within the outline area of the cell, and creates data for hiding the information of the cell when the information cannot be contained within the outline area of the cell.

\* \* \* \* \*